United States Patent
Yang

(10) Patent No.: US 10,095,896 B2
(45) Date of Patent: Oct. 9, 2018

(54) METHOD AND DEVICE FOR PERFORMING SPATIAL POSITIONING ON ELECTRONIC TAG, 3D SIGNING AND HUMAN-COMPUTER INTERACTION

(71) Applicant: ZTE CORPORATION, Shenzhen, Guangdong Province (CN)

(72) Inventor: Xiangling Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/525,956

(22) PCT Filed: Jan. 23, 2015

(86) PCT No.: PCT/CN2015/071413
§ 371 (c)(1),
(2) Date: May 11, 2017

(87) PCT Pub. No.: WO2015/184825
PCT Pub. Date: Dec. 10, 2015

(65) Prior Publication Data
US 2017/0323125 A1 Nov. 9, 2017

(30) Foreign Application Priority Data
Nov. 13, 2014 (CN) .......................... 2014 1 0640983

(51) Int. Cl.
*G06K 7/08* (2006.01)
*G06K 7/10* (2006.01)
*G06K 19/077* (2006.01)

(52) U.S. Cl.
CPC ... *G06K 7/10366* (2013.01); *G06K 19/07773* (2013.01)

(58) Field of Classification Search
CPC ............. G06K 7/08; G06K 7/00; G06F 17/00
(Continued)

(56) References Cited

U.S. PATENT DOCUMENTS

2006/0187051 A1 8/2006 Wu et al.
2007/0055949 A1 3/2007 Thomas
(Continued)

FOREIGN PATENT DOCUMENTS

| CN | 101598792 A | 12/2009 |
| CN | 102819315 A | 12/2012 |
| CN | 103971109 A | 8/2014 |

OTHER PUBLICATIONS

Mathieu Bouet, The 6th Information Technology Laboratory of Paris, University of Pierre and Marie Curie, Pairs, France, et al., RFID Tags: Positioning Principles and Localization Techniques, 2008 IEEE. XP55124776A.

*Primary Examiner* — Edwyn Labaze
(74) *Attorney, Agent, or Firm* — Ling Wu; Stephen Yang; Ling and Yang Intellectual Property

(57) ABSTRACT

Provided are a method and a device for performing spatial positioning on an electronic tag, 3D signature and human-computer interaction. The method for performing spatial positioning on an electronic tag includes: arranging at least three sets of three-dimensionally distributed array antennas on an electronic device, each set of array antennas including multiple antenna array elements extending in one dimension; turning on an electronic tag reader to generate a radio frequency electromagnetic field when spatial positioning is performed on an electronic tag; acquiring induced voltage generated on each antenna array element in each set of array antennas when it is sensed that there is an electronic tag in the radio frequency electromagnetic field; and determining spatial position information of the electronic tag according to the induced voltage.

18 Claims, 8 Drawing Sheets

(58) Field of Classification Search
USPC .................................... 235/451, 375, 439
See application file for complete search history.

(56) References Cited

U.S. PATENT DOCUMENTS

| | | |
|---|---|---|
| 2007/0265799 A1 | 11/2007 | Yamada |
| 2009/0174557 A1* | 7/2009 | Nikitin ............... G06K 7/10316 340/572.7 |
| 2010/0109873 A1 | 5/2010 | DeRose et al. |
| 2010/0275934 A1* | 11/2010 | Keren ................. G01D 5/2066 128/899 |
| 2011/0095948 A1* | 4/2011 | Alexopoulos ........ H01Q 1/2283 343/700 MS |
| 2012/0319903 A1* | 12/2012 | Huseth ..................... G01S 3/74 342/386 |

* cited by examiner

METHOD AND DEVICE FOR PERFORMING SPATIAL POSITIONING ON ELECTRONIC TAG, 3D SIGNING AND HUMAN-COMPUTER INTERACTION

TECHNICAL FIELD

The present disclosure relates to an electronic tag and a feature extraction and authentication technology thereof, in particular to a feature extraction and authentication method and device based on a biological electronic tag, and a tag.

BACKGROUND

RFID is an abbreviation of Radio Frequency Identification, refers to a radio frequency identification technology and is commonly known as an electronic tag. RFID is a noncontact automatic identification technology, which automatically identifies a target object through a radio frequency signal and acquires related data, does not need manual intervention during identification and can work under various severe environments. The RFID technology can identify an object moving at high speed and can simultaneously identify multiple tags, and the operation is quick and convenient to perform. Near Field Communication (NFC) is also called as short-distance wireless communication, which is a short-distance high-frequency wireless communication technology and allows non-contact point-to-point data transmission between electronic devices. This technology is evolved from contactless RFID.

When an electronic tag enters a radio frequency electromagnetic field generated by an electronic tag reader, it will passively or actively send a signal at a certain frequency; and after the electronic tag reader reads information and performs decoding, related data processing is performed in a central information system. The electronic tag reader sometimes may also write information into the electronic tag.

Communication and energy induction modes between the electronic tag reader and the electronic tag include two modes, i.e., inductive coupling and backscatter coupling, herein when inductive coupling is used, after the tag enters the radio frequency electromagnetic field, the tag receives a radio frequency signal sent by the reader and sends product information stored in a chip by using energy obtained by virtue of inductive current; and when backscatter coupling is used, electromagnetic waves transmitted based on a radar principle model meet with a target, then are reflected while carrying target information back based on a spatial propagation rule of electromagnetic waves.

At present, there are electronic signature systems which perform authentication on legal identities of users through electronic tags. However, related electronic signature systems have many security vulnerabilities, electronic codes of electronic tags may be easily imitated or intercepted, and consequently a great number of illegal user accesses are caused.

Existing patents put forward a fingerprint authentication mode to reinforce security guarantee. However, in the current fingerprint authentication mode, fingerprints may be easily imitated or illegally intercepted.

In addition, at present, there are methods for realizing identity authentication through handwriting identification. However, current handwritings are planar and may be easily imitated, and acquisition of spatial handwritings cannot be realized.

SUMMARY

A technical problem to be solved by the present disclosure is to provide a method and an electronic device for performing spatial positioning on an electronic tag, and methods and electronic devices for realizing 3D signature and human-computer interaction based thereon.

In order to solve the above-mentioned technical problem the following technical solution is used.

A method for performing spatial positioning on an electronic tag, applied to an electronic device having an electronic tag reader, includes:

arranging at least three sets of three-dimensionally distributed array antennas on the electronic device, each set of array antennas including a plurality of antenna array elements extending in one dimension;

turning on an electronic tag reader to generate a radio frequency electromagnetic field;

acquiring induced voltage generated on each antenna array element in each set of array antennas when the electronic tag reader senses that there is an electronic tag in the radio frequency electromagnetic field; and determining spatial position information of the electronic tag according to the induced voltage.

In an exemplary embodiment, the step of arranging at least three sets of three-dimensionally distributed array antennas on the electronic device, each set of array antennas including a plurality of antenna array elements extending in one dimension includes:

arranging three sets of array antennas, every two of which are perpendicular to each other, on the electronic device to form a rectangular coordinate system, the plurality of antenna array elements of each set of array antennas being a plurality of microstrip antennas which are uniformly distributed in a line and forming coordinate points of the rectangular coordinate system; and the step of determining the spatial position of the electronic tag according to the induced voltage includes: respectively determining three antenna array elements with first three largest induced voltages in the three sets of array antennas; and using identification information or corresponding coordinate positions of the three antenna array elements with the first three largest induced voltages as the spatial position information.

An electronic device includes a system for performing spatial positioning on an electronic tag. The system includes at least three sets of array antennas, an electronic tag reader module and a positioning module, herein:

the at least three sets of array antennas are arranged on the electronic device and three-dimensionally distributed, each set of array antennas includes a plurality of antenna array elements extending in one dimension;

the electronic tag reader module is respectively and electrically connected with each antenna array element in each set of array antennas and is configured to: after the electronic tag reader is turned on, generate a radio frequency electromagnetic field, and acquire induced voltage generated on each antenna array element in each set of array antennas when the electronic tag reader senses that there is an electronic tag in the radio frequency electromagnetic field; and a positioning module configured to: determine spatial position information of the electronic tag according to the induced voltage.

In an exemplary embodiment, the at least three sets of array antennas are three sets of array antennas which are three-dimensionally distributed on the electronic device, every two of the three sets of array antennas are perpendicular to each other to form a rectangular coordinate system, and the plurality of antenna array elements of each set of array antennas are a plurality of microstrip antennas which are uniformly distributed in a line and form coordinate points of the rectangular coordinate system; and the positioning module is configured to determine the spatial position of the electronic tag according to the induced voltage according to the following mode: respectively determining three antenna array elements with first three largest induced voltages in the three sets of array antennas; and using identification information or corresponding coordinate positions of the three antenna array elements with the first three largest induced voltages as the spatial position information.

In an exemplary embodiment, two sets of the three sets of array antennas are arranged on two adjacent sides of the same surface of the electronic device, and the other set is arranged at a junction of the two adjacent sides and is perpendicular to the surface or is capable of rotating to a position perpendicular to the surface.

A 3D electronic signature method includes:

an electronic device turning on an electronic tag reader function to generate a radio frequency electromagnetic field;

the electronic device using the method for performing spatial positioning on the electronic tag in a signature process to perform continuous spatial positioning on an electronic tag which moves with writing of a user in the radio frequency electromagnetic field; and the electronic device determining a spatial handwriting trace according to spatial position information obtained through spatial positioning, and using the spatial handwriting trace as a 3D signature handwriting of a user acquired at a current time.

In an exemplary embodiment, the electronic tag is a biological electronic tag formed through real-time participation of a body of the user; and the method further includes: the electronic device performing identity authentication on the user by using an identity authentication way based on the biological electronic tag in the signature process, and when the identity authentication passes, saving the 3D signature handwriting of the user acquired at the current time as an authenticated 3D signature handwriting of the user; or the method further includes: the electronic device receiving biological feature information of the user acquired by a sensor in real time through the electronic tag in the signature process, performing authentication on the received biological feature information based on the pre-stored authenticated biological feature information of the user after signing, and when the authentication passes, saving the 3D signature handwriting of the user acquired at the current time as an authenticated 3D signature handwriting of the user.

In an exemplary embodiment, the method further includes: the electronic device performing comparative identification on the 3D signature handwriting of the user acquired at the current time based on the pre-stored authenticated 3D signature handwriting of the user after signing, herein when the identification passes, signature authentication at the current time passes; or when the electronic tag is the biological electronic tag formed through real-time participation of the body of the user, the method further includes: the electronic device using the identity authentication way based on the biological electronic tag in the signature process to perform identity authentication on the user, and when the identity authentication passes, performing comparative identification on the 3D signature handwriting of the user acquired at the current time based on the pre-stored authenticated 3D signature handwriting of the user, herein when the identification passes, signature authentication at the current time passes; or the method further includes: the electronic device receiving biological feature information of the user acquired by a sensor in real time through the electronic tag in the signature process, performing authentication on the received biological feature information based on the pre-stored authenticated biological feature information of the user after signing, and when the authentication passes, performing comparative identification on the 3D signature handwriting of the user acquired at the current time based on the pre-stored authenticated 3D signature handwriting of the user, herein when the identification passes, signature authentication at the current time passes.

In an exemplary embodiment, the identity authentication way based on the biological electronic tag includes:

the electronic device periodically transmitting a radio frequency signal and detecting a response of the biological electronic tag in the signature process, herein each period includes a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and the electronic device judging whether the spatial position information of the biological electronic tag is capable of being detected on each time slice in the signature process, herein when the spatial position information of the biological electronic tag is capable of being detected on each time slice in the signature process, the identity authentication passes.

In an exemplary embodiment, the biological electronic tag is formed by a fingerprint electronic tag being attached to a finger of the user, and the fingerprint electronic tag includes a thin film substrate which has elasticity; an antenna which is formed by a conductive layer adhered to the thin film substrate, herein the antenna includes a fingerprint area, the fingerprint area forms a microstrip antenna printed with a fingerprint pattern when the fingerprint electronic tag is attached to the finger; and a protection film which covers the antenna and is attached to the thin film substrate; or the biological electronic tag is formed by using the finger of the user as an antenna and forming a closed loop with the body of the user; or the biological electronic tag is formed by coating an antenna material on the finger of the user as an antenna and forming a closed loop with the body of the user.

In an exemplary embodiment, the electronic device recording information about time that the electronic tag moves to each positioning point while performing spatial positioning in the signature process, to determine a moving position, speed and direction of the electronic tag in the radio frequency electromagnetic field.

In an exemplary embodiment, the biological feature information of the user acquired in real time includes one or more of fingerprint information, finger vein information and temperature information.

An electronic device capable of realizing 3D electronic signature includes:

the system for performing spatial positioning on the electronic tag configured to: perform continuous spatial positioning on the electronic tag which moves with writing of a user in the radio frequency electromagnetic field in the signature process; and a signature generation module configured to: determine a spatial handwriting trace according to spatial position information obtained through spatial positioning, and use the spatial handwriting trace as a 3D signature handwriting of the user acquired at a current time.

In an exemplary embodiment, the electronic device further includes a system for performing identity authentication based on a biological electronic tag and a signature storage module, herein, the system for performing identity authentication based on a biological electronic tag is configured to: perform identity authentication on the user in the signature process, and send a notification a signature storage module when the identity authentication passes;

the signature storage module is configured to: after the notification is received, save the 3D signature handwriting of the user acquired at the current time as an authenticated 3D signature handwriting of the user;

or, the electronic device further includes a biological feature authentication module and a signature storage module, herein, the biological feature authentication module is configured to: receive biological feature information of the user acquired by a sensor in real time through the electronic tag in the signature process, perform authentication on the received biological feature information based on the pre-stored authenticated biological feature information of the user after signing, and when the authentication passes, send a notification to a signature storage module; and the signature storage module is configured to: after the notification is received, save the 3D signature handwriting of the user acquired at the current time as an authenticated 3D signature handwriting of the user.

In an exemplary embodiment, the electronic device further includes a signature authentication module, herein the signature authentication module is configured to: perform comparative identification on the 3D signature handwriting of the user acquired at the current time based on the pre-stored authenticated 3D signature handwriting of the user after signing, herein when the identification passes, signature authentication at the current time passes;

or, the electronic device further includes a system for performing identity authentication based on a biological electronic tag and a signature authentication module, herein the system for performing identity authentication based on a biological electronic tag is configured to perform identity authentication on the user in the signature process, and when the identity authentication passes, send a notification to a signature authentication module; and the signature authentication module is configured to: after the notification is received, perform comparative identification on the 3D signature handwriting of the user acquired at the current time based on the pre-stored authenticated 3D signature handwriting of the user, herein when the identification passes, signature authentication at the current time passes;

or, the electronic device further includes a biological feature authentication module and a signature authentication module, herein the biological feature authentication module is configured to: receive biological feature information of the user acquired by a sensor in real time through the electronic tag in the signature process, perform authentication on the received biological feature information based on the pre-stored authenticated biological feature information of the user after signing, and when the authentication passes, send a notification to a signature authentication module; and the signature authentication module is configured to: after the notification is received, perform comparative identification on the 3D signature handwriting of the user acquired at the current time based on the pre-stored authenticated 3D signature handwriting of the user, herein when the identification passes, signature authentication at the current time passes.

In an exemplary embodiment, the system for performing identity authentication based on the biological electronic tag includes an electronic tag reader module and an authentication judgment module, herein the electronic tag reader module is configured to: after the electronic tag reader module is turned on, periodically transmit a radio frequency signal and detect a response of the biological electronic tag in the signature process, herein each period includes a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and the authentication judgment module is configured to: judge whether the spatial position information of the biological electronic tag is capable of being detected on each time slice in the signature process, herein when the spatial position information of the biological electronic tag is capable of being detected on each time slice in the signature process, the identity authentication passes.

In an exemplary embodiment, the system for performing spatial positioning on the electronic tag records information about time that the electronic tag moves to each positioning point while performing spatial positioning in the signature process, to determine a moving position, speed and direction of the electronic tag in the radio frequency electromagnetic field.

A 3D human-computer interaction method includes:

an electronic device turning on an electronic tag reader function to generate a radio frequency electromagnetic field;

the electronic device using the above mentioned method in a 3D human-computer interaction process to perform continuous spatial positioning on an electronic tag which moves with a user limb in the radio frequency electromagnetic field;

the electronic device determining a moving trace of the user limb in the radio frequency electromagnetic field according to spatial position information obtained through spatial positioning; and converting the moving trace in the radio frequency electromagnetic field into a moving trace in a 3D holographic image space and accordingly determining an operation of the user.

In an exemplary embodiment, the electronic device uses the above mentioned method of forming a rectangular coordinate system through three sets of array antennas in the 3D human-computer interaction process and performs continuous spatial positioning on the electronic tag which moves with the user limb in the radio frequency electromagnetic field; and the step of converting the moving trace in the radio frequency electromagnetic field into a moving trace in the 3D holographic image space includes:

using the rectangular coordinate system formed by the three sets of array antennas arranged on the electronic device as a three-dimensional space coordinate system of the 3D holographic image space, and using the moving trace of the electronic tag in the rectangular coordinate system as the moving trace in the 3D holographic image space.

In an exemplary embodiment, the electronic tag is a biological electronic tag formed through real-time participation of a body of the user;

the method further includes: the electronic device performing identity authentication on the user by using an identity authentication way based on the biological electronic tag in the 3D human-computer interaction process, and when the identity authentication passes, accepting the operation of the user, and when the identity authentication does not pass, not accepting the operation of the user; and the identity authentication way based on the biological electronic tag includes:

the electronic device periodically transmitting a radio frequency signal and detecting a response of the biological electronic tag in the 3D human-computer interaction process, herein each period includes a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and the electronic device judging whether the spatial position information of the biological electronic tag is capable of being detected on each time slice in the 3D human-computer interaction process, herein when the spatial position information of the biological electronic tag is capable of being detected on each time slice in the 3D human-computer interaction process, the identity authentication passes, and when the spatial position information of the biological electronic tag is not capable of being detected on each time slice in the 3D human-computer interaction process, the identity authentication does not pass.

In an exemplary embodiment, the biological electronic tag is formed by a fingerprint electronic tag being attached to a finger of the user; and the fingerprint electronic tag includes a thin film substrate which has elasticity; an antenna which is formed by a conductive layer adhered to the thin film substrate, herein the antenna includes a fingerprint area, the fingerprint area forms a microstrip antenna printed with a fingerprint pattern when the fingerprint electronic tag is attached to the finger; and a protection film which covers the antenna and is attached to the thin film substrate; or the biological electronic tag is formed by using the finger of the user as an antenna and forming a closed loop with the body of the user; or the biological electronic tag is formed by coating an antenna material on the finger of the user as an antenna and forming a closed loop with the body of the user.

An electronic device, used for 3D human-computer interaction, includes:

a system for performing spatial positioning on an electronic tag, configured to: perform continuous spatial positioning on an electronic tag which moves with a user limb in the radio frequency electromagnetic field in a 3D human-computer interaction process; and an operation identification module configured to: determine a moving trace of the user limb in the radio frequency electromagnetic field according to spatial position information obtained through spatial positioning, convert the moving trace into a moving trace in a 3D holographic image space and accordingly identify an operation of the user.

In an exemplary embodiment, the system for performing spatial positioning on the electronic tag is the above mentioned system for performing spatial positioning on the electronic tag in a rectangular coordinate system formed by three sets of array antennas;

the operation identification module determines the moving trace of the user limb in the radio frequency electromagnetic field according to spatial position information obtained through spatial positioning according to the following mode:

using the rectangular coordinate system formed by the three sets of array antennas arranged on the electronic device as a three-dimensional space coordinate system of the 3D holographic image space, and using the moving trace of the electronic tag in the rectangular coordinate system as the moving trace in the 3D holographic image space.

In an exemplary embodiment, the electronic device further includes: a system for performing identity authentication based on a biological electronic tag, configured to: perform identity authentication on the user in the 3D human-computer interaction process, and when the identity authentication passes, accept the operation of the user, and when the identity authentication does not pass, not accept the operation of the user;

the system for performing identity authentication based on the biological electronic tag includes:

an electronic tag reader module, configured to: after the electronic tag reader module is turned on, periodically transmit a radio frequency signal and detect a response of the biological electronic tag in the 3D human-computer interaction process, herein each period includes a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and an authentication judgment module, configured to: judge whether the spatial position information of the biological electronic tag is capable of being detected on each time slice in the 3D human-computer interaction process, herein when the spatial position information of the biological electronic tag is capable of being detected on each time slice in the 3D human-computer interaction process, the identity authentication passes, and hen the spatial position information of the biological electronic tag is not capable of being detected on each time slice in the 3D human-computer interaction process, the identity authentication does not pass.

The above-mentioned solution realizes spatial positioning for the electronic tag. On this basis, spatial signature can be performed by using the electronic tag, from a planar handwriting to a spatial handwriting, a signature safety factor is increased, authentication can be performed on an identity of a signer based on the biological electronic tag or by acquiring the biological feature information of the user in the signature process, the signature security is further guaranteed, the authentication and the signature are organically combined together and the operation is very convenient to perform. On the basis of performing spatial positioning on the electronic tag, 3D human-computer interaction can also be performed by using the electronic tag.

DETAILED DESCRIPTION

The embodiments of the present disclosure will be described below in detail with reference to the drawings. It needs to be stated that embodiments in the present application and features in the embodiments may be mutually and freely combined under a situation of no conflict.

Embodiment 1

Thin film electronic tags have already widely existed. However, there is no biological electronic tag generated through real-time participation of body of a user. A fingerprint electronic tag in this embodiment can be attached to a finger to form a biological electronic tag. The uniqueness of the physical property of the biological electronic tag is achieved through the uniqueness of a fingerprint of a user.

Figure 1:
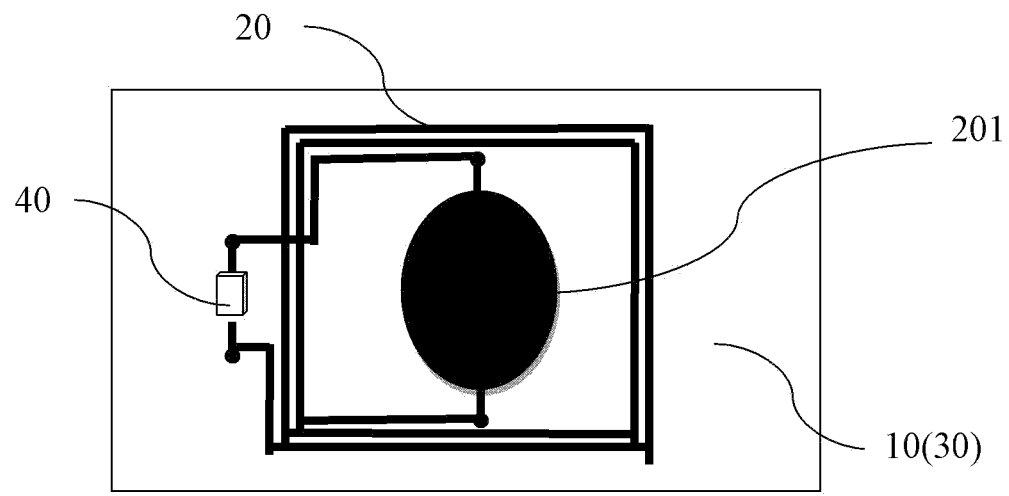
FIG. 1 illustrates a structural schematic view of a fingerprint electronic tag according to embodiment 1 of the present disclosure.

The fingerprint electronic tag in this embodiment, as illustrated in FIG. 1, includes:

a thin film substrate 10 which has elasticity;

an antenna 20 which is formed by a conductive layer adhered to the thin film substrate 10, herein the antenna includes a fingerprint area 201, the fingerprint area 201 forms a microstrip antenna printed with a fingerprint pattern when the fingerprint electronic tag is attached to the finger;

a protection film 30 which covers the antenna and is attached to the thin film substrate; and a chip 40 which is packaged between the thin film substrate and the protection film and is electrically connected with the antenna.

Since the thin film substrate 10 and the protection film 30 are the same in size and are attached together, a reference sign "1(3)" is used in the drawing to illustrate a marking position at which not only the thin film substrate 10 but also the protection film 30 exist. The thin film substrate 10 may be a polyvinyl chloride (PVC) thin film. In order to conveniently stick the tag to the finger, in the embodiment, the thin film substrate 10 is a self-adhesive thin film substrate, and its surface to which no conductive layer is adhered has adhesiveness. However, the present disclosure is not limited thereto, and fixation of the tag and the finger may be realized through other objects such as an adhesive tape when the tag is put on.

As illustrated in the drawing, the antenna 20 in this embodiment is generally a loop antenna. However, a local area is transformed to the fingerprint area 201 to form a microstrip antenna, the resonant frequency of the microstrip antenna can be easily adjusted by grooving at a proper position, grooving can change a previous surface current path on the microstrip antenna such that current passes zigzag around a groove edge, the effective path becomes longer and equivalently the coil length is increased. As proved in theory and practice, the resonant frequency adjustment range of the grooved frequency-adjustable thin substrate printed microstrip antenna can exceed 50%. In the embodiment, the fingerprint area 201 is located at a central position of the thin film substrate. Although it is illustrated as an elliptical shape, it may also be other regular and irregular shapes such as circular shape and rectangular shape, as long as the fingerprint can be conveniently printed. The antenna 20 may be adhered to the thin film substrate 10 through a printing mode using nano-silver paste. However, it is not limited thereto and the antenna 20 may also be adhered to the thin film substrate 10 through other processes by using other materials such as silver, copper, graphite, graphene or ultrasonic melting materials.

When the chip 40 is electrically connected with the antenna 20, a flip chip technology may be used to interconnect two poles of the chip 40 with the two poles of the antenna. The chip 40 is mounted on one side of the thin film substrate 10. Identification such as a sequence number (which may consist of any symbols) may be pre-stored in the chip 40, and the sequence number may identity a specific fingerprint electronic tag. The chip 40 may also be a chip having a processing capability and/or a large-capacity data storage capability to realize more complex functions. For the fingerprint electronic tag in the embodiment of the present disclosure, the chip 40 is optional. When there is no chip 40, the antenna may be designed to be a closed structure to form a closed loop. As well, when the tag is put on the finger, the antenna 20 and the body form a closed loop.

Materials of the protection film for packaging the thin film electronic tag may be varied from adhesive sticker, paper and non-woven fabric to plastic. In this embodiment, a PVC thin film is used, the PVB thin film covers the PVC self-adhesive thin film which is used as the substrate, integral gluing is performed through a cold gluing mode, then the film is die-cut into film slices, and the size of the film slices may be designed as required, e.g., the size may be 25 mm*40 mm to 30 mm*50 mm.

Figure 2:
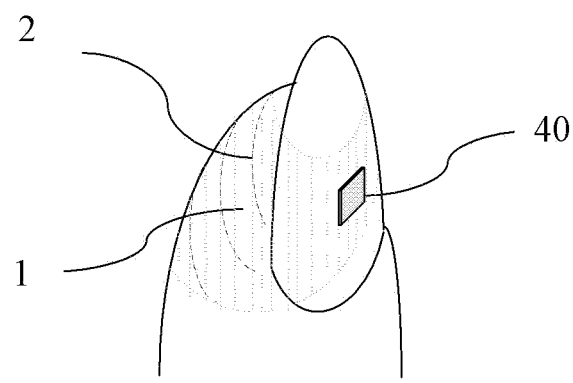
FIG. 2 illustrates a schematic view of the fingerprint electronic tag in FIG. 1 put on a finger.

FIG. 2 illustrates a schematic view of a fingerprint electronic tag 1 put on a finger. As illustrated in FIG. 2, the fingerprint electronic tag 1 has a fingerprint area 201, the fingerprint area 201 is attached to a fingerprint part of a finger pulp when the fingerprint electronic tag 1 is put on, then other parts are attached to the finger at convenience, and a chip 40 is placed on a nail to take a certain supporting and protection effect.

Figure 3:
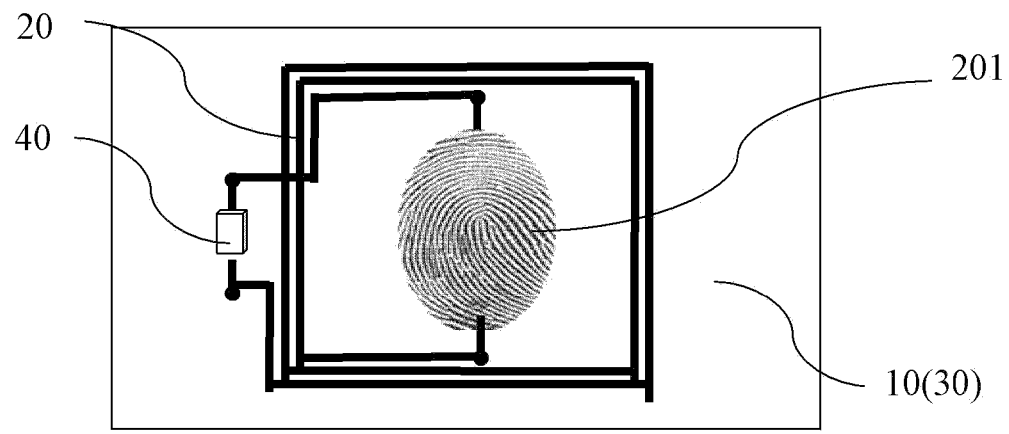
FIG. 3 illustrates a schematic view of a finger pattern printed in a fingerprint area of the fingerprint electronic tag in FIG. 1.

At this moment, since the fingerprint area 201 is closely attached to the fingerprint part, as illustrated in FIG. 3, a pattern of the fingerprint 2 is relief-printed in the fingerprint area 201 (similar to printing an antenna pattern), this is equivalent to grooving on a microstrip antenna, and the physical property of the original antenna is changed, i.e., the fingerprint pattern printed in the fingerprint area 201 enables the fingerprint area 201 to form a microstrip antenna with a fingerprint grooving property. In addition, due to the rich change of fingerprints, the range of change in frequency of different tags can be more greatly increased than by purely changing the coil length. Due to the uniqueness of the fingerprint of the user, a biological electronic tag (referring to an electronic tag formed through real-time participation of a body of a user) which has a unique frequency property and uniquely represents a user is obtained. The excitation of the biological electronic tag to a radio frequency electromagnetic field of an electronic tag reader will produce a unique feedback signal, and the electronic tag reader can identify this unique tag.

When the finger leaves the fingerprint electronic tag, since the material of the fingerprint electronic tag has elasticity, the fingerprint electronic tag may be restored to the original shape, the fingerprint in the fingerprint area disappears and the fingerprint can be prevented from being illegally stolen. Even though a planar fingerprint pattern of a certain user is stolen, others cannot generate the biological electronic tag in this embodiment. Therefore, the biological electronic tag is difficult for others to imitate except the user himself/herself.

Embodiment 2

The biological electronic tag formed based on embodiment 1 or other forms of biological electronic tags has/have physiological properties corresponding to biological features such as fingerprints of a user, and these physical properties may be extracted and saved by certain means and be used for authenticating the biological electronic tag.

Figure 4:
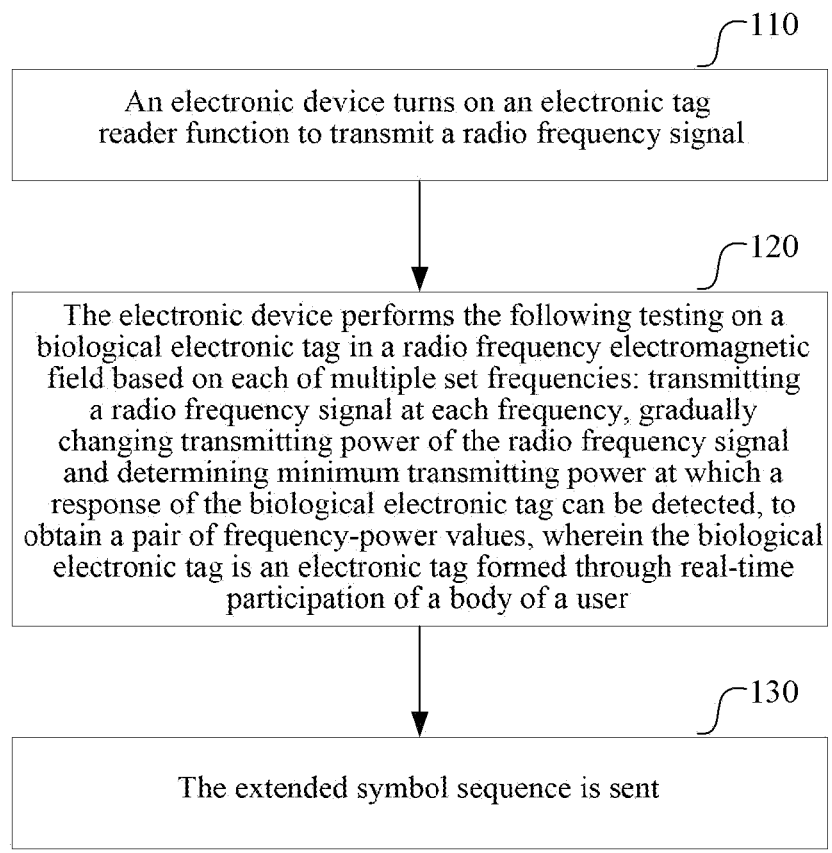
FIG. 4 illustrates a flowchart of a method according to embodiment 2 of the present disclosure.

This embodiment relates to a biological feature extraction method based on a biological electronic tag and a corresponding electronic device. As illustrated in FIG. 4, the method includes the following steps.

In step 110, an electronic device turns on an electronic tag reader function to transmit a radio frequency signal.

It needs to be stated that the electronic device in this text (including this embodiment and other embodiments) may include one physical device and may also include a plurality of physical devices which are in wired or wireless connection with one another and are used for completing biological feature extract. In a typical application, the electronic device is a smart phone. However, the present disclosure is not limited thereto, and the electronic device may be any one of electronic devices such as IPAD, PDA and PC having an electronic tag (such as RFID tag or NFC tag) reader function and a logical processing capability, and may also consist of an electronic tag reader and another device connected with the electronic tag reader and having a logical processing capability. The electronic tag reader may also be called as a reading device, a scanner, a reading head, a communicator, a reader-writer (depending on whether the electronic tag can rewrite data wirelessly), or the like.

In step 120, the electronic device performs the following testing on a biological electronic tag in a radio frequency electromagnetic field based on each of multiple set frequencies: transmitting a radio frequency signal at each frequency, gradually changing transmitting power of the radio frequency signal and determining minimum transmitting power at which a response of the biological electronic tag can be detected, to obtain a pair of frequency-power values, herein the biological electronic tag is an electronic tag formed through real-time participation of a body of a user.

By taking the biological electronic tag formed by the fingerprint electronic tag in embodiment 1 as an example, the fingerprint electronic tag is put on a finger of the user to form a biological electronic tag, the user places the finger in a working range of an electronic tag reader (by taking an NFC reader-writer as an example), the NFC reader-writer sends a signal to the tag at low power at a set frequency, the transmitting power is gradually increased till a response of the tag is detected (i.e., it is detected that there is an electronic tag in the radio frequency electromagnetic field), and the power at this moment is the minimum response power at this frequency. Or, a signal is sent to the tag at high power at the set frequency, the transmitting power is gradually decreased till no response from the tag is detected, and the last power at which the response is detected is the minimum response power at this frequency. The above-mentioned testing is performed sequentially for the plurality of set frequencies, the minimum response power corresponding to each frequency can be obtained, and the frequency and the corresponding power are recorded as a pair of frequency-power values. The number of the set frequencies needs to guarantee that obtained sequences correspond to fingerprints one to one and may be selected according to experience, testing results, statistical data and the like.

In step 130, the electronic device uses all frequency-power values obtained through testing to form a user-specific frequency-minimum response power sequence and saves the user-specific frequency-minimum response power sequence as biological feature information of the user.

The above-mentioned obtained user-specific frequency-minimum response power sequence corresponds to a fingerprint of the user, may also be called as an electronic fingerprint of the user and can uniquely identify a biological electronic tag formed by a fingerprint. Minimum response powers of different biological electronic tags with respect to multiple frequencies are different. Therefore, a user electronic fingerprint database, i.e., a list of a series of specific frequencies and corresponding minimum response power, may be established, for example:

Fingerprint 1: (13.28, 2.5); (13.00, 4); ... ; (12.72, 8).

Fingerprint 2: (13.28, 4.0); (13.00, 8); ... ; (12.72, 15).

⋮

Fingerprint n: (13.28, 8.0); (13.00, 15); ... ; (12.72, 23).

Electronic fingerprints of the user may be saved in a user terminal, may also be acquired and authenticated by authorized authentication departments and may be acquired on line through authentication websites. The user may go to corresponding organizations for authentication in person. Authenticated electronic fingerprint information is saved in a security database server.

Biological electronic tags may be generated in real time by using biological features such as fingerprints and veins on fingers, and the biological features and the electronic tags may be combined by means of sticking, coating, wearing, implantation or the like. The biological electronic tags are difficult to copy and counterfeit, and naturally, directly and uniquely represent a certain organism. For example, the biological electronic tag formed by attaching the fingerprint electronic tag in embodiment 1 to the finger of the user may be used. However, the present disclosure is not limited thereto. For example, the biological electronic tag may also be formed by using the finger of the user as an antenna (different fingerprints present different frequency properties in the radio frequency electromagnetic field) and forming a closed loop with the body of the user, or may also be formed by coating an antenna material (e.g., strong-conductivity materials such as graphene) on the finger of the user as an antenna to obtain reinforced fingerprint features and forming a closed loop with the body of the user.

When the user-specific frequency-minimum response power sequence is saved, in a scenario of multiple users, the frequency-minimum response power sequences also need to correspond to the biological electronic tags, such that the corresponding frequency-minimum response power sequence can be conveniently selected when authentication is performed on the user in future. In order to achieve this purpose, when the above-mentioned features are extracted, before step 120, the method may further include the following step that: the electronic device reads identification information of the biological electronic tag (the identification information may be saved in a chip of the biological electronic tag) and saves the identification information corresponding to the user-specific frequency-minimum response power sequence.

The embodiment of the present disclosure further discloses a computer program, including program instructions, which, when executed by a computer, enable the computer to execute the biological feature extraction method based on the biological electronic tag illustrated in FIG. 4.

The embodiment of the present disclosure further discloses a carrier carrying the computer program.

Figure 5:
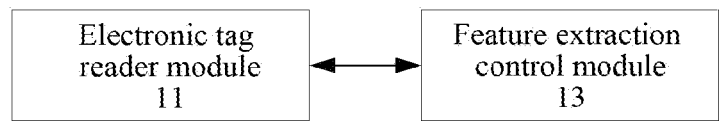
FIG. 5 illustrates a modular diagram of an electronic device according to embodiment 2 of the present disclosure.

Correspondingly, the electronic device in this embodiment includes a biological feature extraction system based on a biological electronic tag. As illustrated in FIG. 5, the system includes an electronic tag reader module 11 and a feature extraction control module 13.

The electronic tag reader module 11 is configured to: perform the following testing on a biological electronic tag in a radio frequency electromagnetic field based on each of multiple set frequencies after the electronic tag reader module 11 is turned on: transmitting a radio frequency signal at each frequency, gradually changing transmitting power of the radio frequency signal and determining minimum transmitting power at which a response of the biological electronic tag can be detected, to obtain a pair of frequency-power values, herein the biological electronic tag is an electronic tag formed through real-time participation of a body of a user.

The feature extraction control module 13 configured to: configure the frequency and the power, control the electronic tag reader module to complete the testing, use all frequency-power values obtained through testing to form a user-specific frequency-minimum response power sequence and save the user-specific frequency-minimum response power sequence as biological feature information of the user.

In the embodiment, the electronic tag reader module may be further configured to: read identification information of the biological electronic tag; and correspondingly save the identification information when the feature extraction control module saves the user-specific frequency-minimum response power sequence.

Embodiment 3

After the extraction of the biological features is completed based on the biological electronic tag in embodiment 2, authentication may be performed on the user by using the extracted biological feature information. This embodiment provides a corresponding identity authentication method based on a biological electronic tag and a corresponding electronic device.

Figure 6:
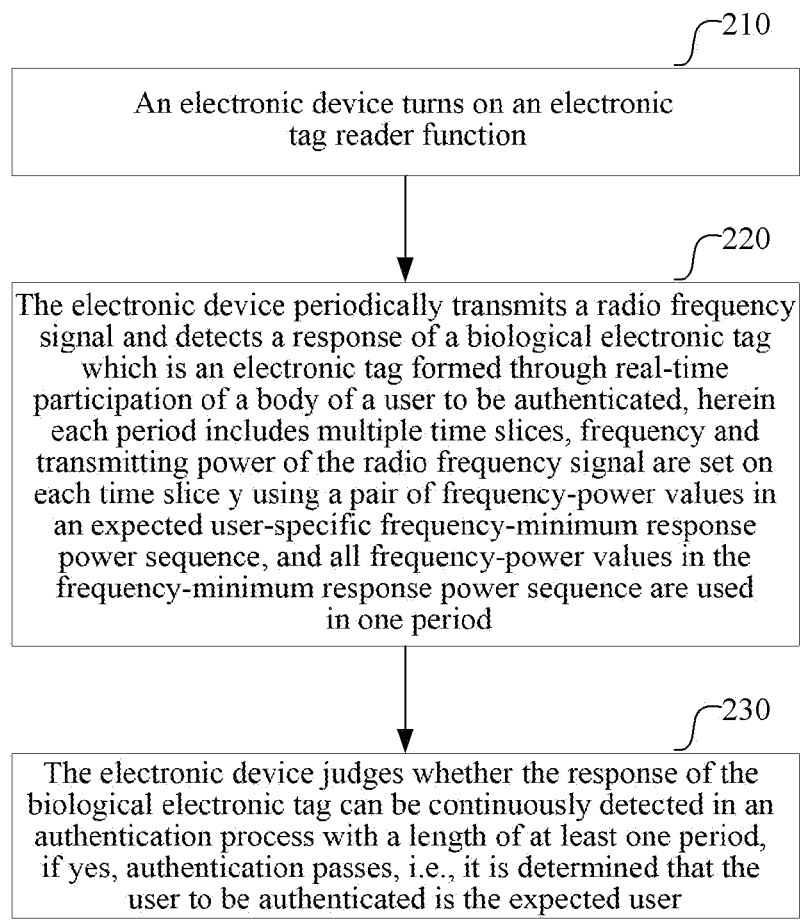
FIG. 6 illustrates a flowchart of a method according to embodiment 3 of the present disclosure.

As illustrated in FIG. 6, the identity authentication method based on the biological electronic tag in this embodiment includes the following steps.

In step 210, an electronic device turns on an electronic tag reader function.

In step 220, the electronic device periodically transmits a radio frequency signal and detects a response of a biological electronic tag which is an electronic tag formed through real-time participation of a body of a user to be authenticated, herein each period includes multiple time slices, frequency and transmitting power of the radio frequency signal are set on each time slice by using a pair of frequency-power values in an expected user-specific frequency-minimum response power sequence, and all frequency-power values in the frequency-minimum response power sequence are used in one period.

The electronic device may be a mobile phone having an NFC function or a special identity authentication device having an NFC function. However, the electronic device is not limited thereto.

By taking a mobile phone as an example, an authentication mode of switching working frequency and power of an electronic tag reader in a time-sharing way may be turned on an NFC function (including an electronic tag reader function) on the mobile phone. The expected user-specific frequency-minimum response power sequence may be obtained from a security database server or the mobile phone itself and is used for setting working frequency and power of an NFC function authentication mode. According to the process of acquiring the user-specific frequency-minimum response power sequence in embodiment 2, it can be seen that only the biological electronic tag formed through real-time participation of the body of the expected user can make a continuous response to the radio frequency signal with frequency and power which are set in such a way, i.e., the response can be detected in each time slice in cycles.

In this step, the biological electronic tag may be formed by attaching the fingerprint electronic tag in embodiment 1 to the finger of the user; or the biological electronic tag is formed by using the finger of the user as an antenna and forming a closed loop with the body of the user; or the biological electronic tag is formed by coating an antenna material on the finger of the user as an antenna and forming a closed loop with the body of the user.

In step 230, the electronic device judges whether the response of the biological electronic tag can be continuously detected in an authentication process with a length of at least one period (i.e., the response can be detected in each time slice in cycles), if yes, authentication passes, i.e., it is determined that the user to be authenticated is the expected user.

If the response of the biological electronic tag is continuously detected in the authentication process with the length of at least one period, it indicates that the biological electronic tag which is detected currently has the expected user-specific frequency-minimum response power sequence. Since the biological electronic tag is formed through real-time participation of the body of the user, and biological electronic tags formed by different users are different, when it is authenticated that the biological electronic tag is the biological electronic tag of the expected user, it can be determined that the user to be authenticated is the expected user.

In order to realize the authentication by one electronic device on multiple users, before the electronic device periodically transmits the radio frequency signal, the method further includes the following steps: reading identification information of the biological electronic tag, searching for a corresponding user-specific frequency-minimum response power sequence according to the identification information, and using the searched frequency-minimum response power sequence as the expected user-specific frequency-minimum response power sequence. Specifically, during searching, searching may be performed locally in the electronic device and may also be performed by accessing to a server in which user frequency-minimum response power sequences are stored in a network.

The embodiment of the present disclosure further discloses a computer program, including program instructions, which, when executed by a computer, enable the computer to execute the biological feature extraction method based on the biological electronic tag illustrated in FIG. 6.

The embodiment of the present disclosure further discloses a carrier carrying the computer program.

Figure 7:
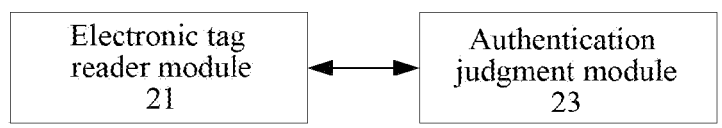
FIG. 7 illustrates a modular diagram of an electronic device according to embodiment 3 of the present disclosure.

Correspondingly, the electronic device in this embodiment includes an identity authentication system based on a biological electronic tag. As illustrated in FIG. 7, the system includes an electronic tag reader module 21 and an authentication judgment module 23.

The electronic tag reader module 21 is configured to: periodically transmit a radio frequency signal and detect a response of a biological electronic tag which is an electronic tag formed through real-time participation of a body of a user to be authenticated after the electronic tag reader module 21 is turned on, herein each period includes multiple time slices, frequency and transmitting power of the radio frequency signal are set on each time slice by using a pair of frequency-power values in an expected user-specific frequency-minimum response power sequence, and all frequency-power values in the frequency-minimum response power sequence are used in one period.

The authentication judgment module 23 is configured to: judge whether the response of the biological electronic tag can be continuously detected in an authentication process with a length of at least one period, herein if yes, authentication passes, i.e., it is determined that the user to be authenticated is the expected user.

In the embodiment, the electronic tag reader module 21 is further configured to: before periodically transmitting the radio frequency signal, read identification information of the biological electronic tag, search for a corresponding user-specific frequency-minimum response power sequence according to the identification information, and use the searched frequency-minimum response power sequence as the expected user-specific frequency-minimum response power sequence.

Embodiment 4

Figure 8:
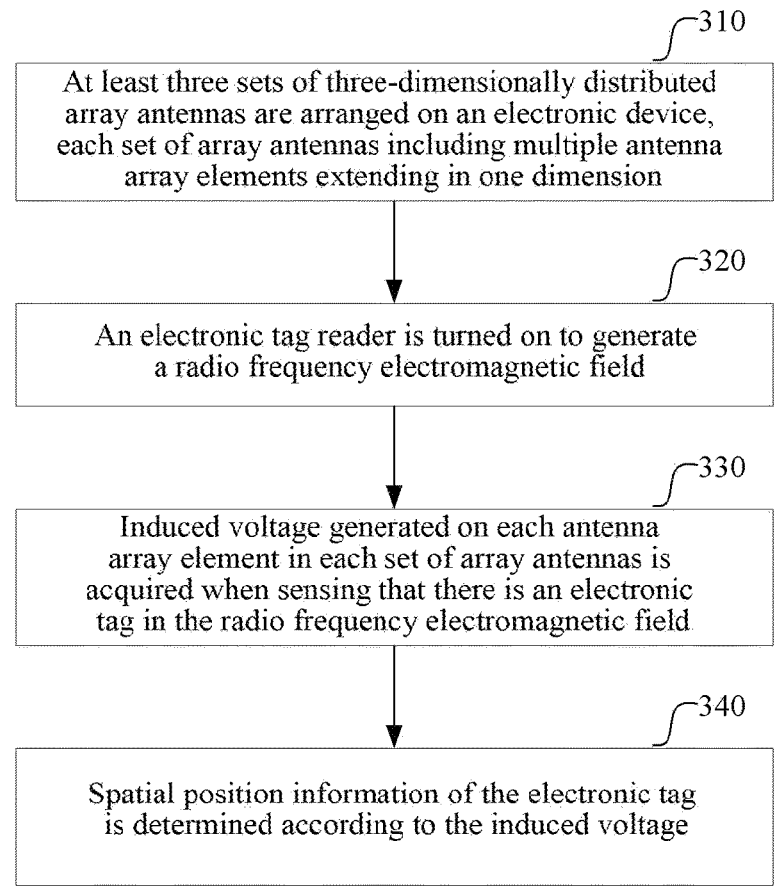
FIG. 8 illustrates a flowchart of a method according to embodiment 4 of the present disclosure.

This embodiment relates to a method for performing spatial positioning on an electronic tag and a corresponding electronic device. As illustrated in FIG. 8, the method includes the following steps.

In step 310, at least three sets of three-dimensionally distributed array antennas are arranged on an electronic device, each set of array antennas including multiple antenna array elements extending in one dimension.

The array antennas may be NFC or RFID antenna arrays. In the embodiment, microstrip antennas are used as antenna array elements and the microstrip antennas may be patches in a rectangular shape or other shapes.

FIG. 9A, FIG. 9B, FIG. 9C and FIG. 9D respectively illustrate an example of three sets of array antennas arranged on an electronic device. A mobile phone is taken as an example of the electronic device.

Figure 9A:
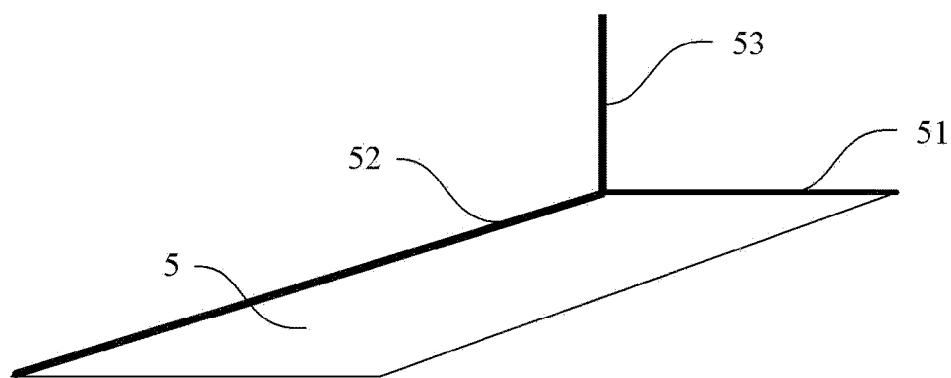
FIG. 9A illustrates a schematic view of arrangement of three sets of array antennas according to embodiment 4 of the present disclosure, and FIG. 9B to FIG. 9D respectively illustrate structural schematic views of three sets of array antennas in FIG. 9A.
Figure 9B:
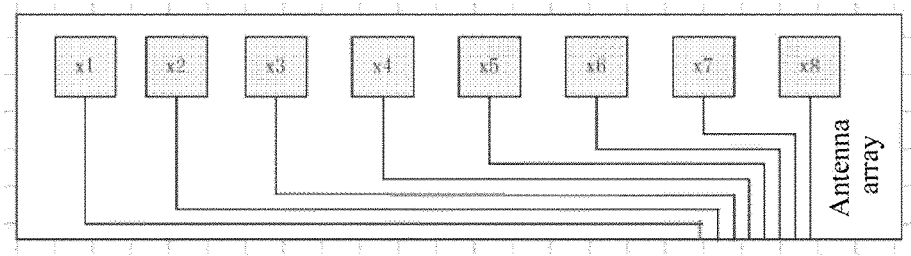
Figure 9C:
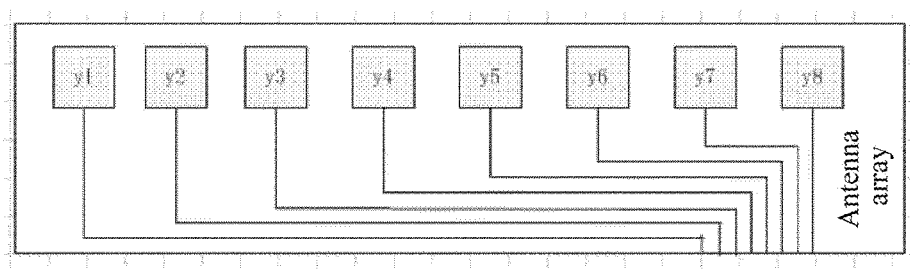
Figure 9D:
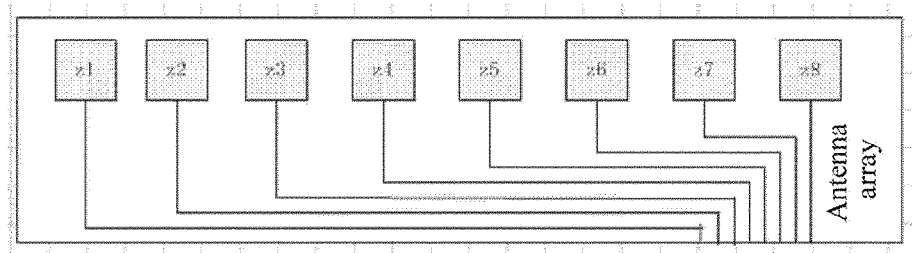

As illustrated in FIG. 9A, three sets of array antennas, every two of which are perpendicular to each other, are arranged on one surface such as a lower surface of a mobile phone 5 and include a first set of array antennas 51 illustrated in FIG. 9B, a second set of array antennas 52 illustrated in FIG. 9C and a third set of array antennas 53 illustrated in FIG. 9D, which form a rectangular coordinate system, and the three sets of array antennas respectively correspond to axis X, Y and Z. Herein, the first set of array antennas 51 and the second set of array antennas 52 are arranged on two adjacent sides of the same surface of the mobile phone, and the third set of array antennas 53 are arranged at a junction of the two adjacent sides, are perpendicular to the surface or can rotate to a position perpendicular to the surface and can be folded when in no use.

As illustrated in FIG. 9B to FIG. 9D, the multiple antenna array elements of each set of array antennas are multiple microstrip antennas which are uniformly distributed in a line and form coordinate points of the rectangular coordinate system. For example, the first set of array antennas 51 include antenna array elements $x1, x2, \ldots, x8$; the second set of array antennas 52 include antenna array elements $y1, y2, \ldots, y8$; and the third set of array antennas 53 include antenna array elements $z1, z2, \ldots, z8$. The number of the antenna array elements in the drawings is just exemplary, and the number of the antenna array elements of each set of array antennas may be selected according to the requirement on positioning accuracy.

In step 320, an electronic tag reader is turned on to generate a radio frequency electromagnetic field.

In step 330, induced voltage generated on each antenna array element in each set of array antennas is acquired when sensing that there is an electronic tag in the radio frequency electromagnetic field.

In step 340, spatial position information of the electronic tag is determined according to the induced voltage.

Specifically, three antenna array elements with the first three largest induced voltages in the three sets of array antennas may be respectively determined; and identification information or corresponding coordinate positions of the three antenna array elements with the first three largest induced voltage are used as the spatial position information. Since induced electromotive force is obtained when the biological electronic tag moves in the radio frequency electromagnetic field, further energy is fed back, all antenna arrays respectively obtain induced voltages and the electronic device respectively judges voltage on a feeder led out from each antenna array element of each set of antenna arrays. In the three sets of antennas which are respectively distributed in directions of axis X, Y and Z, each set inevitably has an antenna array element $xn$, $yn$, $zn$ which is the closest to the tag in perpendicular distance and receives the signal with the strongest intensity sent by the tag. Therefore, it may be considered as that the antenna array element $xn$, $yn$, $zn$ represents the coordinate value $xn$, $yn$, $zn$ of the fingerprint electronic tag, i.e., the coordinate values of the space in which the finger is located currently may be expressed as (xn, yn, zn). For the sake of convenience in expression, the coordinate value may also be replaced by identification such as an index of the antenna array element. The index may be converted into a coordinate value when a specific spatial position needs to be determined.

The embodiment of the present disclosure further discloses a computer program, including program instructions, which, when executed by a computer, enable the computer to execute the biological feature extraction method based on the biological electronic tag illustrated in FIG. 8.

The embodiment of the present disclosure further discloses a carrier carrying the computer program.

Figure 10:
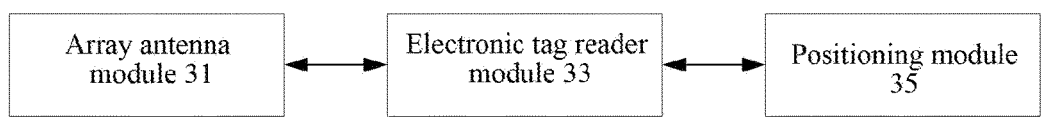
FIG. 10 illustrates a modular diagram of an electronic device according to embodiment 4 of the present disclosure.

Correspondingly, the electronic device in this embodiment includes a system for performing spatial positioning on an electronic tag. As illustrated in FIG. 10, the system includes an array antenna module 31, an electronic tag reader module 33, and a positioning module 35.

The array antenna module 31 includes at least three sets of three-dimensionally distributed array antennas arranged on the electronic device and a corresponding circuit, each set of array antennas including multiple antenna array elements extending in one dimension. With respect to the array antennas, a reference may be made to the contents recorded above and FIG. 9A to FIG. 9D.

The electronic tag reader module 33 is respectively and electrically connected with each antenna array element in each set of array antennas and is configured to: generate a radio frequency electromagnetic field after the electronic tag reader module 33 is turned on, and acquire induced voltage generated on each antenna array element in each set of array antennas when the electronic tag reader module 33 senses that there is an electronic tag in the radio frequency electromagnetic field.

The positioning module 35 configured to: determine spatial position information of the electronic tag according to induced voltage, e.g., respectively determine three antenna array elements with the first three largest induced voltage in the three sets of array antennas; and use identification information or corresponding coordinate positions of the three antenna array elements as the spatial position information.

Embodiment 5

Based on the method for performing spatial positioning on the electronic tag in embodiment 4, a signature of a related user on paper may be extended to a 3D electronic signature and a terminal such as a mobile phone may be used to implement.

Figure 11:
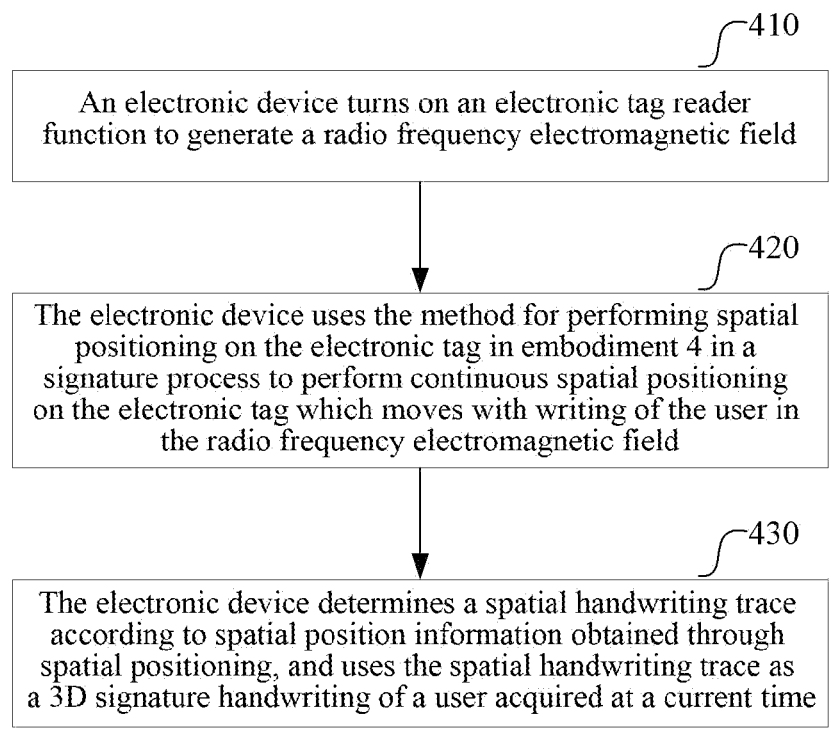
FIG. 11 illustrates a flowchart of a method according to embodiment 5 of the present disclosure.

This embodiment relates to a 3D electronic signature method and a corresponding electronic device. As illustrated in FIG. 11, the method includes the following steps.

In step 410, an electronic device turns on an electronic tag reader function to generate a radio frequency electromagnetic field.

In step 420, the electronic device uses the method for performing spatial positioning on the electronic tag in embodiment 4 in a signature process to perform continuous spatial positioning on the electronic tag which moves with writing of the user in the radio frequency electromagnetic field.

In this embodiment, the electronic tag is located on a finger and/or is formed through participation of a finger. In the signature process, the user may write a character but not limited to writing a character and the user may even create a calligraphy and painting work.

In step 430, the electronic device determines a spatial handwriting trace according to spatial position information obtained through spatial positioning, and uses the spatial handwriting trace as a 3D signature handwriting of a user acquired at a current time.

In the embodiment, in the signature process, information about time that the electronic tag moves to each positioning point may also be further recorded through an electronic tag reader or a processor in the electronic device while spatial positioning is performed, and the information about time and the spatial position information synthesize a time-space coordinate (xn, yn, zn, tn). Accordingly, the moving position, speed and direction of the electronic tag/finger in the radio frequency electromagnetic field may be calculated, and the obtained speed and direction information may reflect handwriting habits of the user in more detail and may be used for more accurate handwriting identification. In addition, finger shapes may also be added through devices such as infrared sensors and contents such as geographical locations may also be added through GPS or wireless communication base stations.

In application scenarios such as financial transaction and document signing, the 3D electronic signature obtained through steps 410, 420 and 430 needs to be authenticated. Therefore, an authenticated 3D signature handwriting of the user needs to be pre-stored. Specifically, signature authentication is performed at the electronic device locally or at an authentication organization. The following two exemplary modes may be used.

Mode 1:

The electronic tag is a biological electronic tag formed through real-time participation of a body of a user.

In the embodiment, the biological electronic tag is formed by attaching the fingerprint electronic tag in embodiment 1 to the finger of the user; and the fingerprint electronic tag includes a thin film substrate which has elasticity; an antenna which is formed by a conductive layer adhered to the thin film substrate, herein the antenna includes a fingerprint area, the fingerprint area forms a microstrip antenna printed with a fingerprint pattern when the fingerprint electronic tag is attached to the finger; and a protection film which covers the antenna and is attached to the thin film substrate. However, the present disclosure is not limited thereto. For example, the biological electronic tag may also be formed by using the finger of the user as an antenna and forming a closed loop with the body of the user; or the biological electronic tag may also be formed by coating an antenna material on the finger of the user as an antenna and forming a closed loop with the body of the user, etc.

The electronic device uses the identity authentication method based on the biological electronic tag to perform identity authentication on the user in the signature process, if identity authentication passes, the 3D signature handwriting of the user acquired at a current time is saved as an authenticated 3D signature handwriting of the user, and otherwise, it may be discarded.

Herein, the method for performing authentication on the user by using the identity authentication method based on the biological electronic tag is similar to the method in embodiment 3 and includes the following steps that:

the electronic device periodically transmits a radio frequency signal and detects a response of the biological electronic tag in the signature process, herein each period includes multiple time slices, frequency and transmitting power of the radio frequency signal are set on each time slice by using a pair of frequency-power values in an expected user-specific frequency-minimum response power sequence (which may be acquired locally or from a network authorized authentication organization), and all frequency-power values in the frequency-minimum response power sequence are used in one period; and the electronic device judges whether the spatial position information of the biological electronic tag can be detected on each time slice in the signature process, if yes, authentication of the fingerprint information in the 3D signature at the current time passes, i.e., it is considered that identity authentication passes, and otherwise, signature authentication at the current time does not pass. If the authentication of the fingerprint information in the signature passes, the 3D signature handwriting of the user acquired at the current time may be saved as an authenticated 3D signature handwriting of the user, and otherwise, it may be discarded.

Mode 2:

The electronic device receives biological feature information of the user acquired by a sensor in real time through the electronic tag in the signature process, performs authentication on the received biological feature information based on the pre-stored authenticated biological feature information of the user after signing (equivalently performs identity authentication on the user), if authentication passes, saves the 3D signature handwriting of the user acquired at the current time as an authenticated 3D signature handwriting of the user, and otherwise, it may be discarded. Herein, the authenticated biological feature information of the user may be acquired from a corresponding authorized organization or a user or by other means. In the signature authentication process, the electronic device may obtain the authenticated biological feature information of the user locally or from a network authorized authentication organization.

This mode is different from mode 1 and does not use the biological electronic tag formed through real-time participation of the body but acquires the biological feature information of the user in real time through a sensor. The acquisition of the biological features may be realized by selecting and using a radio frequency fingerprint sensor or other fingerprint sensors, a vein feature recognizer, a temperature sensor or the like. The biological feature information acquired by the sensor may be directly transmitted to the electronic device or may be forwarded to the electronic device through the electronic tag on the finger.

Of course, modes of obtaining the authenticated 3D signature handwriting of the user are not limited to the above-mentioned two modes. When it is confirmed that the operation is performed by the user himself/herself (e.g., having corresponding authority), the 3D signature handwriting of the user acquired at the current time may be directly used as the authenticated 3D signature handwriting of the user. However, the above-mentioned two modes change the traditional signature authentication way, such that the authentication becomes more convenient and secure. The authenticated 3D signature handwriting of the user and the user-specific frequency-minimum response power sequence may be saved locally in the electronic device or under a corresponding username of a security database in a network server of the authentication organization.

In application scenarios such as financial transaction and document signing, the 3D signature handwriting of the user obtained by using steps 410, 420 and 430 is a signature to be authenticated. Specifically, the authentication process may use the following three exemplary modes.

Mode 1

The electronic device performs comparative identification on the 3D signature handwriting of the user acquired at the current time based on the pre-stored authenticated 3D signature handwriting of the user after signing, if identification passes, signature authentication at the current time passes. Comparative identification may be performed locally in the electronic device or may be performed by a network authorized authentication organization or other organizations under a request. Specific handwriting identification methods are not contents of the present disclosure.

Mode 2

The electronic tag is a biological electronic tag formed through real-time participation of a body of a user.

In the embodiment, the biological electronic tag is formed by attaching the fingerprint electronic tag in embodiment 1 to the finger of the user; and the fingerprint electronic tag includes a thin film substrate which has elasticity; an antenna which is formed by a conductive layer adhered to the thin film substrate, herein the antenna includes a fingerprint area, the fingerprint area forms a microstrip antenna printed with a fingerprint pattern when the fingerprint electronic tag is attached to the finger; and a protection film which covers the antenna and is attached to the thin film substrate. However, the present disclosure is not limited thereto. For example, the biological electronic tag may also be formed by using the finger of the user as an antenna and forming a closed loop with the body of the user; or the biological electronic tag may also be formed by coating an antenna material on the finger of the user as an antenna and forming a closed loop with the body of the user, etc.

The electronic device uses the identity authentication method based on the biological electronic tag in the signature process to perform identity authentication on the user, and if identity authentication passes, performs comparative identification on the 3D signature handwriting of the user acquired at the current time based on the pre-stored authenticated 3D signature handwriting of the user, if identification passes, signature authentication at the current time passes; and if identity authentication does not pass or identification does not pass, signature authentication at the current time does not pass.

Herein, the method for performing authentication on the user identity by using the identity authentication method based on the biological electronic tag is similar to the method in embodiment 3 and includes the following steps that:

the electronic device periodically transmits a radio frequency signal and detects a response of the biological electronic tag in the signature process, herein each period includes multiple time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and the electronic device judges whether the spatial position information of the biological electronic tag can be detected on each time slice in the signature process, if yes, authentication of the identity (fingerprint information) passes, and otherwise, signature authentication at the current time does not pass. If the authentication of the identity (fingerprint information) in the signature passes, the signature handwriting acquired at the same time may comparatively identified based on the authenticated 3D signature handwriting of the user pre-stored locally or by the network authorized authentication organization, to judge whether signature authentication passes.

In the process of performing authentication on the user by using the identity authentication method based on the biological electronic tag, the transmitting frequency and power of the electronic tag reader are set by using the user-specific frequency-minimum response power sequence, i.e., in the entire process of finger signature action, the electronic tag reader is always kept in a mode of periodically switching the frequency-minimum response power values described in embodiment 3. If the coordinate position of the finger is always detected on each time slice in the signature process, it indicates that identity (fingerprint) authentication passes. Therefore, the identity (fingerprint) authentication process and the positioning process of the electronic tag (i.e., the obtained signature handwriting) are fully and organically combined together, and authentication does not need to be performed respectively. If fingerprint authentication does not pass, signature authentication inevitably does not pass; and if the complete signature handwriting can be obtained, it indicates that the fingerprint is legal and the signature handwriting may be further identified.

Mode 3

The electronic device receives biological feature information of the user acquired by a sensor in real time through the electronic tag in the signature process, performs authentication on the received biological feature information based on the pre-stored authenticated biological feature information of the user after signing, and if authentication passes, performs comparative identification on the 3D signature handwriting of the user acquired at the current time based on the authenticated 3D signature handwriting of the user, if identification passes, signature authentication at the current time passes. Herein, the biological feature information of the user acquired by the sensor in real time includes one or more of fingerprint information, finger vein information and temperature information.

After the signature is completed, the 3D signature handwriting of the user acquired at the current time may also be saved on a storable entity by means of images and/or videos.

The embodiment of the present disclosure further discloses a computer program, including program instructions, which, when executed by a computer, enable the computer to execute the biological feature extraction method based on the biological electronic tag illustrated in FIG. 11 and any related biological feature extraction method based on the biological electronic tag.

The embodiment of the present disclosure further discloses a carrier carrying the computer program.

Figure 12:
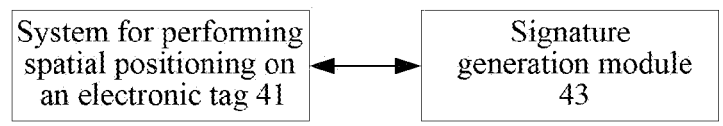
FIG. 12 illustrates a modular diagram of an electronic device according to embodiment 5 of the present disclosure.

Correspondingly, the electronic device provided by the embodiment of the present disclosure can realize 3D electronic signature. As illustrated in FIG. 12, the electronic device includes a system 41 for performing spatial positioning on an electronic tag in embodiment 4 and a signature generation module 43.

The system 41 for performing spatial positioning on an electronic tag in embodiment 4 is used for performing continuous spatial positioning on the electronic tag which moves with writing of the user in the radio frequency electromagnetic field in the signature process. In the embodiment, the system records information about time that the electronic tag moves to each positioning point while performing spatial positioning in the signature process, to determine a moving position, speed and direction of the electronic tag in the radio frequency electromagnetic field.

The signature generation module 43 is configured to: determine a spatial handwriting trace according to spatial position information obtained through spatial positioning, and use the spatial handwriting trace as a 3D signature handwriting of a user acquired at a current time.

In the embodiment, the signature may be pre-stored and used as the authenticated 3D signature handwriting of the user, at this time, the electronic device further includes:

a system for performing identity authentication based on a biological electronic tag, used for performing identity authentication on the user in the signature process, and sending a notification to a signature storage module if identity authentication passes; and the signature storage module configured to: after the notification is received, save the 3D signature handwriting of the user acquired at the current time as an authenticated 3D signature handwriting of the user.

Or the electronic device further includes:

a biological feature authentication module configured to: receive biological feature information of the user acquired by a sensor in real time through the electronic tag in the signature process, perform authentication on the received biological feature information based on the pre-stored authenticated biological feature information of the user after signing, and if authentication passes, send a notification to a signature storage module; and the signature storage module configured to: after the notification is received, save the 3D signature handwriting of the user acquired at the current time as an authenticated 3D signature handwriting of the user.

The signature may also be authenticated as a signature to be authenticated, and at this moment, the electronic device further includes:

a signature authentication module configured to: perform comparative identification on the 3D signature handwriting of the user acquired at the current time based on the pre-stored authenticated 3D signature handwriting of the user after signing, herein if identification passes, signature authentication at the current time passes.

Or, the electronic device further includes:

a system for performing identity authentication based on a biological electronic tag, used for performing identity authentication on the user in the signature process, and if identity authentication passes, sending a notification to a signature authentication module; and the signature authentication module configured to: after the notification is received, perform comparative identification on the 3D signature handwriting of the user acquired at the current time based on the pre-stored authenticated 3D signature handwriting of the user, herein if identification passes, signature authentication at the current time passes.

Or, the electronic device further includes:

a biological feature authentication module configured to: receive biological feature information of the user acquired by a sensor in real time through the electronic tag in the signature process, perform authentication on the received biological feature information based on the pre-stored authenticated biological feature information of the user after signing, and if authentication passes, send a notification to a signature authentication module; and the signature authentication module configured to: after the notification is received, perform comparative identification on the 3D signature handwriting of the user acquired at the current time based on the pre-stored authenticated 3D signature handwriting of the user, herein if identification passes, signature authentication at the current time passes.

The system for performing identity authentication based on the biological electronic tag in embodiment 3 is similar to the system in embodiment 3 and includes:

an electronic tag reader module configured to, after the electronic tag reader module is turned on, periodically transmit a radio frequency signal in the signature process and detect a response of the biological electronic tag, herein each period includes multiple time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and an authentication judgment module configured to: judge whether the spatial position information of the biological electronic tag can be detected on each time slice in the signature process, herein if yes, it indicates that biological features (fingerprints) are coincident, i.e., identity authentication passes. Continuous processing may be performed by the signature authentication module.

Based on the 3D signature solution, the user may use a finger to write in air, and the spatial handwriting trace (featured handwriting habit) may be fused with the fingerprints and even other biological features to realize digitalization, and may be fused with the entire handwriting trace to generate a new 3D personal signature. By writing in air, the dimensions are increased, no marks are left and it is difficult to imitate. The fingerprint is not saved separate from the signature but is naturally combined with the signature handwriting in real time, and thereby higher security can be guaranteed. The signature is completed once for all in real time. For the user, it is natural and convenient and is also compliant with the traditional habits. The situation that fingerprint extraction, traditional handwriting signature and stamping are respectively performed is avoided. The method can be used for the signature of certificate and contract documents and signature confirmation links in application scenarios such as electronic wallet, online payment, mobile phone and computer unlocking and door access control, so as to improve the transaction and information security guarantee by a way closest to the natural and traditional modes; and may also be used for application scenarios such as signature in book sales, celebrity handwriting and even calligraphy and painting creation and collection. Particularly, in combination with the 3D holographic image technology, 3D human-computer interface interaction may also be realized.

Embodiment 6

On an electronic device configured with a 3D holographic image technology, by overlapping a 3D holographic image space with a radio frequency electromagnetic field space generated by the electronic device and using the spatial positioning technology of the electronic tag, 3D human-computer interface interaction may also be realized.

Figure 13:
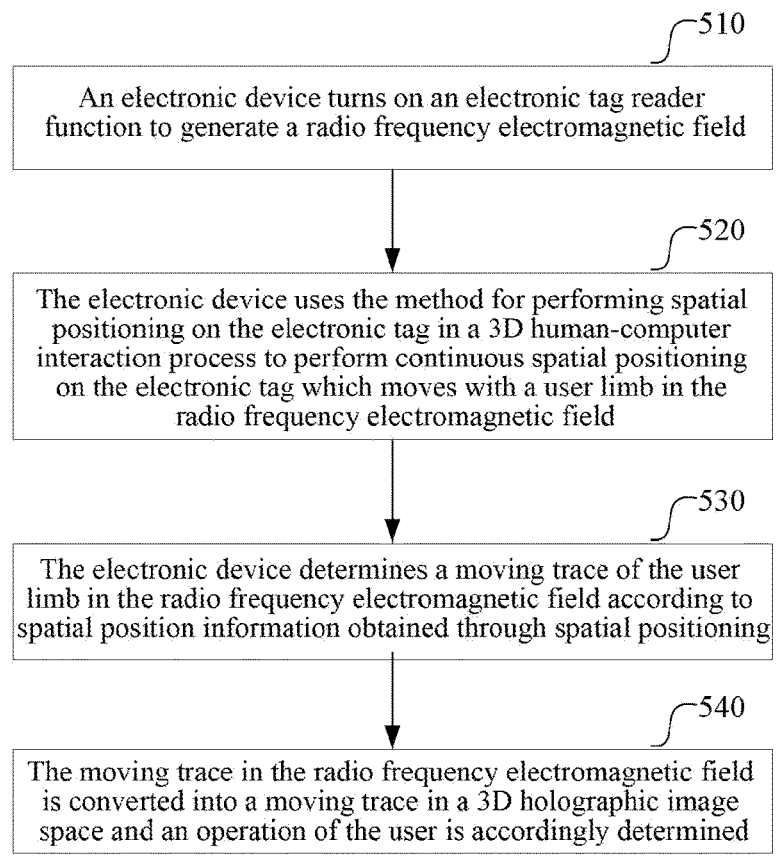
FIG. 13 illustrates a flowchart of a method according to embodiment 6 of the present disclosure.

A 3D human-computer interaction method and electronic device in the embodiment are illustrated in FIG. 13, the method includes the following steps.

In step 510, an electronic device turns on an electronic tag reader function to generate a radio frequency electromagnetic field, and at the same time, the electronic device turns on a 3D holographic image space display function.

In step 520, the electronic device uses the method for performing spatial positioning on the electronic tag in a 3D human-computer interaction process to perform continuous spatial positioning on the electronic tag which moves with a user limb in the radio frequency electromagnetic field.

The method for performing spatial positioning on the electronic tag may be the method in embodiment 4.

In step 530, the electronic device determines a moving trace of the user limb in the radio frequency electromagnetic field according to spatial position information obtained through spatial positioning.

In step 540, the moving trace in the radio frequency electromagnetic field is converted into a moving trace in a 3D holographic image space and an operation of the user is accordingly determined.

In this step, a rectangular coordinate system formed by three sets of array antennas arranged on the electronic device may be used as a three-dimensional space coordinate system of the 3D holographic image space, and the moving trace of the electronic tag in the rectangular coordinate system may be used as the moving trace in the 3D holographic image space.

Figure 14:
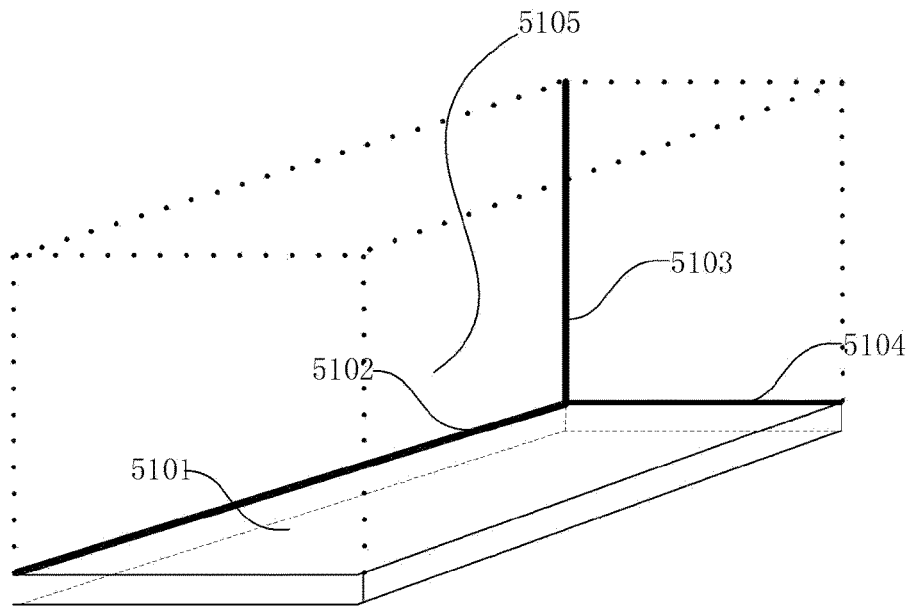
FIG. 14 illustrates a schematic view of a relationship between a 3D holographic image space and a rectangular coordinate system according to embodiment 6 of the present disclosure.

As illustrated in FIG. 14, a solid-line flat cube represents a mobile phone 5101, three sets of array antennas 5102, 5103 and 5104 are distributed in X,Y,Z directions of one surface of the mobile phone 5101, and a dotted-line cube area 5105 is a naturally overlapped portion of the 3D image space and the electromagnetic field space, i.e., an effective space for 3D human-computer interaction. At this moment, the three-dimensional space coordinate system of the 3D holographic image is a three-dimensional rectangular coordinate system marked by the antenna arrays in steps 310-340. By calculating whether the coordinate of the position of the finger in the space coordinate system falls into the range of the spatial coordinate where a certain hotspot or a control of the 3D holographic image is located, whether the smart terminal device (such as a mobile phone) should make a response to the action of the finger may be judged, and this is called as 3D human-computer interaction.

In this embodiment, a biological electronic tag formed through real-time participation of a body of the user may be used. At this moment, the method further includes the following step that: the electronic device performs identity authentication on the user by using an identity authentication method based on the biological electronic tag in the 3D human-computer interaction process, and if identity authentication passes, accepts the operation of the user, and if identity authentication does not pass, does not accept the operation of the user. When identity authentication does not pass, it may be considered as that the user is an illegal user and the 3D human-computer interaction process is stopped.

No additional processing is needed in the method for performing identity authentication in the 3D interaction process (and the 3D signature process in the previous embodiment) to organically combine the identity authentication with the user operation, the operation is very convenient to perform, the security is high and the application value is very great.

The identity authentication method based on the biological electronic tag is similar to the method in embodiment 3 and includes the following steps that:

the electronic device periodically transmits a radio frequency signal and detects a response of the biological electronic tag in the 3D human-computer interaction process, herein each period includes multiple time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and the electronic device judges whether the spatial position information of the biological electronic tag can be detected on each time slice in the 3D human-computer interaction process, if yes, identity authentication passes, and if not, identity authentication does not pass.

In the embodiment, the biological electronic tag is formed by a fingerprint electronic tag which is attached to a finger of the user; and the fingerprint electronic tag includes a thin film substrate which has elasticity; an antenna which is formed by a conductive layer adhered to the thin film substrate, herein the antenna includes a fingerprint area, the fingerprint area forms a microstrip antenna printed with a fingerprint pattern when the fingerprint electronic tag is attached to the finger; and a protection film which covers the antenna and is attached to the thin film substrate. However, the present disclosure is not limited thereto. For example, the biological electronic tag may also be formed by using the finger of the user as an antenna and forming a closed loop with the body of the user; or the biological electronic tag may also be formed by coating an antenna material on the finger of the user as an antenna and forming a closed loop with the body of the user, etc.

The embodiment of the present disclosure further discloses a computer program, including program instructions, which, when executed by a computer, enable the computer to execute the biological feature extraction method based on the biological electronic tag illustrated in FIG. 13 and any related biological feature extraction method based on the biological electronic tag.

The embodiment of the present disclosure further discloses a carrier carrying the computer program.

Figure 15:
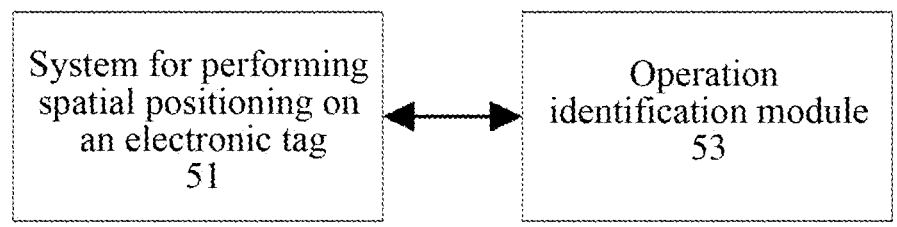
FIG. 15 illustrates a modular diagram of an electronic device according to embodiment 6 of the present disclosure.

Correspondingly, the electronic device in this embodiment is used for 3D human-computer interaction. As illustrated in FIG. 15, the electronic device includes a system 51 for performing spatial positioning on an electronic tag in embodiment 4 and an operation identification module 53.

The system 51 for performing spatial positioning on an electronic tag in embodiment 4 is used for performing continuous spatial positioning on the electronic tag which moves with a user limb in the radio frequency electromagnetic field in a 3D human-computer interaction process.

The operation identification module 53 is configured to: determine a moving trace of the user limb in the radio frequency electromagnetic field according to spatial position information obtained through spatial positioning, convert the moving trace into a moving trace in a 3D holographic image space and accordingly identify an operation of the user.

When the system for performing spatial positioning on the electronic tag is a rectangular coordinate system formed by three sets of array antennas, the rectangular coordinate system formed by the three sets of array antennas arranged on the electronic device may be used as a three-dimensional space coordinate system of the 3D holographic image space, and the moving trace of the electronic tag in the rectangular coordinate system may be used as the moving trace in the 3D holographic image space.

The electronic device may further includes a system for performing identity authentication based on a biological electronic tag, used for performing identity authentication on the user in the 3D human-computer interaction process, and if identity authentication passes, the operation of the user is accepted, and if identity authentication does not pass, the operation of the user is not accepted.

The system for performing identity authentication based on the biological electronic tag is similar to the system in embodiment 3 and includes an electronic tag reader module and an authentication judgment module.

The electronic tag reader module is configured to: after the electronic tag reader module is turned on, periodically transmit a radio frequency signal and detect a response of the biological electronic tag in the 3D human-computer interaction process, herein each period includes multiple time slices, frequency and transmitting power of the radio frequency signal are set on each time slice by using a pair of frequency-power values in an expected user-specific frequency-minimum response power sequence, and all frequency-power values in the frequency-minimum response power sequence are used in one period.

The authentication judgment module is configured to judge whether the spatial position information of the biological electronic tag can be detected on each time slice in the 3D human-computer interaction process, if yes, identity authentication passes, and if not, identity authentication does not pass.

One skilled in the art can understand that all or partial steps in the above-mentioned methods may be completed by relevant hardware instructed by a program, and the program may be stored in a computer readable storage medium such as a read-only memory, a magnetic disc or a compact disc. Optionally, all or partial steps in the above-mentioned embodiments may also be implemented by using one or more integrated circuits. Correspondingly, each module/unit in the above-mentioned embodiments may be implemented by means of hardware and may also be implemented by means of a software function module. The present disclosure is not limited to combinations of hardware and software in any specific form.

It needs to be stated that the present disclosure may also have various other embodiments. One skilled in the art may make various corresponding modifications and variations to the present disclosure without departing from the rule and essence of the present disclosure. However, these corresponding modifications and variations shall be all included in the protection scope of the attached claims of the present disclosure.

INDUSTRIAL APPLICABILITY

The above-mentioned solution realizes spatial positioning for the electronic tag. On this basis, spatial signature can be performed by using the electronic tag, from a planar handwriting to a spatial handwriting, a signature safety factor is increased, authentication can be performed on an identity of a signer based on the biological electronic tag or by acquiring the biological feature information of the user in the signature process, the signature security is further guaranteed, the authentication and the signature are organically combined together and the operation is very convenient to perform. On the basis of performing spatial positioning on the electronic tag, 3D human-computer interaction can also be performed by using the electronic tag. Therefore, the present disclosure has very strong industrial applicability.

What I claim is:

1. A method for performing spatial positioning on an electronic tag, applied to an electronic device having an electronic tag reader, comprising:

arranging at least three sets of three-dimensionally distributed array antennas on the electronic device, each set of array antennas comprising a plurality of antenna array elements extending in one dimension;

turning on an electronic tag reader to generate a radio frequency electromagnetic field;

acquiring induced voltage generated on each antenna array element in each set of array antennas when the electronic tag reader senses that there is an electronic tag in the radio frequency electromagnetic field; and determining spatial position information of the electronic tag according to the induced voltage;

wherein:

the step of arranging at least three sets of three-dimensionally distributed array antennas on the electronic device, each set of array antennas comprising a plurality of antenna array elements extending in one dimension comprises:

arranging three sets of array antennas, every two of which are perpendicular to each other, on the electronic device to form a rectangular coordinate system, the plurality of antenna array elements of each set of array antennas being a plurality of microstrip antennas which are uniformly distributed in a line and forming coordinate points of the rectangular coordinate system; and the step of determining the spatial position of the electronic tag according to the induced voltage comprises: respectively determining three antenna array elements with first three largest induced voltages in the three sets of array antennas; and using identification information or corresponding coordinate positions of the three antenna array elements with the first three largest induced voltages as the spatial position information.

2. A 3D electronic signature method, comprising:

an electronic device turning on an electronic tag reader function to generate a radio frequency electromagnetic field;

the electronic device using the method according to claim 1 in a signature process to perform continuous spatial positioning on an electronic tag which moves with writing of a user in the radio frequency electromagnetic field; and the electronic device determining a spatial handwriting trace according to spatial position information obtained through spatial positioning, and using the spatial handwriting trace as a 3D signature handwriting of the user acquired at a current time.

3. The 3D electronic signature method according to claim 2, wherein:

the electronic tag is a biological electronic tag formed through real-time participation of a body of the user; and the method further comprises:

the electronic device performing identity authentication on the user by using an identity authentication way based on the biological electronic tag in the signature process, and when the identity authentication passes, saving the 3D signature handwriting of the user acquired at the current time as an authenticated 3D signature handwriting of the user; or the electronic device receiving biological feature information of the user acquired by a sensor in real time through the electronic tag in the signature process, performing authentication on the received biological feature information based on pre-stored authenticated biological feature information of the user after signing, and when the authentication passes, saving the 3D signature handwriting of the user acquired at the current time as an authenticated 3D signature handwriting of the user, or, wherein the method further comprises:

the electronic device performing comparative identification on the 3D signature handwriting of the user acquired at the current time based on pre-stored authenticated 3D signature handwriting of the user after signing, wherein when the identification passes, signature authentication at the current time passes; or when the electronic tag is the biological electronic tag formed through real-time participation of the body of the user, the electronic device using the identity authentication way based on the biological electronic tag in the signature process to perform identity authentication on the user, and when the identity authentication passes, performing comparative identification on the 3D signature handwriting of the user acquired at the current time based on the pre-stored authenticated 3D signature handwriting of the user, wherein when the identification passes, signature authentication at the current time passes; or the electronic device receiving biological feature information of the user acquired by a sensor in real time through the electronic tag in the signature process, performing authentication on the received biological feature information based on the pre-stored authenticated biological feature information of the user after signing, and when the authentication passes, performing comparative identification on the 3D signature handwriting of the user acquired at the current time based on the pre-stored authenticated 3D signature handwriting of the user, wherein when the identification passes, signature authentication at the current time passes.

4. The 3D electronic signature method according to claim 3, wherein the identity authentication way based on the biological electronic tag comprises:

the electronic device periodically transmitting a radio frequency signal and detecting a response of the biological electronic tag in the signature process, wherein each period comprises a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and the electronic device judging whether the spatial position information of the biological electronic tag is capable of being detected on each time slice in the signature process, wherein when the electronic device is capable of detecting the spatial position information of the biological electronic tag on each time slice in the signature process, the identity authentication passes, and, the biological electronic tag is formed by a fingerprint electronic tag being attached to a finger of the user, and the fingerprint electronic tag comprises a thin film substrate which has elasticity; an antenna which is formed by a conductive layer adhered to the thin film substrate, wherein the antenna comprises a fingerprint area, the fingerprint area forms a microstrip antenna printed with a fingerprint pattern when the fingerprint electronic tag is attached to the finger; and a protection film which covers the antenna and is attached to the thin film substrate; or the biological electronic tag is formed by using the finger of the user as an antenna and forming a closed loop with the body of the user; or the biological electronic tag is formed by coating an antenna material on the finger of the user as an antenna and forming a closed loop with the body of the user.

5. The 3D electronic signature method according to claim 3, wherein:

the biological feature information of the user acquired in real time comprises one or more of fingerprint information, finger vein information and temperature information.

6. The 3D electronic signature method according to claim 2, wherein the method further comprises:

the electronic device recording information about time that the electronic tag moves to each positioning point while performing spatial positioning in the signature process, to determine a moving position, speed and direction of the electronic tag in the radio frequency electromagnetic field.

7. A 3D human-computer interaction method, comprising:

an electronic device turning on an electronic tag reader function to generate a radio frequency electromagnetic field;

the electronic device using the method according to claim 1 in a 3D human-computer interaction process to perform continuous spatial positioning on an electronic tag which moves with a user limb in the radio frequency electromagnetic field;

the electronic device determining a moving trace of the user limb in the radio frequency electromagnetic field according to spatial position information obtained through spatial positioning; and converting the moving trace in the radio frequency electromagnetic field into a moving trace in a 3D holographic image space and accordingly determining an operation of the user.

8. The 3D human-computer interaction method according to claim 7, wherein:

the step of converting the moving trace in the radio frequency electromagnetic field into a moving trace in the 3D holographic image space comprises:

using a rectangular coordinate system formed by three sets of array antennas arranged on the electronic device as a three-dimensional space coordinate system of the 3D holographic image space, and using the moving trace of the electronic tag in the rectangular coordinate system as the moving trace in the 3D holographic image space.

9. The 3D human-computer interaction method according to claim 7, wherein:

the electronic tag is a biological electronic tag formed through real-time participation of a body of the user;

the method further comprises: the electronic device performing identity authentication on the user by using an identity authentication way based on the biological electronic tag in the 3D human-computer interaction process, and when the identity authentication passes, accepting the operation of the user, and when the identity authentication does not pass, not accepting the operation of the user; and the identity authentication way based on the biological electronic tag comprises:

the electronic device periodically transmitting a radio frequency signal and detecting a response of the biological electronic tag in the 3D human-computer interaction process, wherein each period comprises a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and the electronic device judging whether the spatial position information of the biological electronic tag is capable of being detected on each time slice in the 3D human-computer interaction process, wherein when the spatial position information of the biological electronic tag is capable of being detected on each time slice in the 3D human-computer interaction process, the identity authentication passes, and when the spatial position information of the biological electronic tag is not capable of being detected on each time slice in the 3D human-computer interaction process, the identity authentication does not pass, and, the biological electronic tag is formed by a fingerprint electronic tag being attached to a finger of the user; and the fingerprint electronic tag comprises a thin film substrate which has elasticity; an antenna which is formed by a conductive layer adhered to the thin film substrate, wherein the antenna comprises a fingerprint area, the fingerprint area forms a microstrip antenna printed with a fingerprint pattern when the fingerprint electronic tag is attached to the finger; and a protection film which covers the antenna and is attached to the thin film substrate; or the biological electronic tag is formed by using the finger of the user as an antenna and forming a closed loop with the body of the user; or the biological electronic tag is formed by coating an antenna material on the finger of the user as an antenna and forming a closed loop with the body of the user.

10. An electronic device, comprising a system for performing spatial positioning on an electronic tag, wherein the system for performing spatial positioning on the electronic tag comprises at least three sets of array antennas, an electronic tag reader module and a positioning module, wherein:

the at least three sets of array antennas are arranged on the electronic device and are three-dimensionally distributed, each set of array antennas comprises a plurality of antenna array elements extending in one dimension;

the electronic tag reader module is respectively and electrically connected with each antenna array element in each set of array antennas and is configured to: after the electronic tag reader is turned on, generate a radio frequency electromagnetic field, and acquire induced voltage generated on each antenna array element in each set of array antennas when the electronic tag reader senses that there is an electronic tag in the radio frequency electromagnetic field; and the positioning module is configured to: determine spatial position information of the electronic tag according to the induced voltage;

wherein:

the at least three sets of array antennas are three sets of array antennas which are three-dimensionally distributed on the electronic device, every two of the three sets of array antennas are perpendicular to each other to form a rectangular coordinate system, and the plurality of antenna array elements of each set of array antennas are a plurality of microstrip antennas which are uniformly distributed in a line and form coordinate points of the rectangular coordinate system; and the positioning module is configured to determine the spatial position of the electronic tag according to the induced voltage according to the following mode: respectively determining three antenna array elements with first three largest induced voltages in the three sets of array antennas; and using identification information or corresponding coordinate positions of the three antenna array elements with the first three largest induced voltages as the spatial position information.

11. The electronic device according to claim 10, wherein:
two sets of the three sets of array antennas are arranged on two adjacent sides of a same surface of the electronic device, and the other set is arranged at a junction of the two adjacent sides and is perpendicular to the surface or is capable of rotating to a position perpendicular to the surface.

12. An electronic device for realizing 3D electronic signature, comprising: a signature generation module and the system for performing spatial positioning on the electronic tag according to claim 10, wherein:
the system for performing spatial positioning on the electronic tag is configured to: perform continuous spatial positioning on the electronic tag which moves with writing of a user in the radio frequency electromagnetic field in the signature process; and
the signature generation module is configured to: determine a spatial handwriting trace according to spatial position information obtained through spatial positioning, and use the spatial handwriting trace as a 3D signature handwriting of the user acquired at a current time.

13. The electronic device according to claim 12, wherein:
the electronic device further comprises: a system for performing identity authentication based on a biological electronic tag and a signature storage module, wherein,
the system for performing identity authentication based on the biological electronic tag is configured to: perform identity authentication on the user in the signature process, and send a notification to the signature storage module when the identity authentication passes; and
the signature storage module is configured to: after the notification is received, save the 3D signature handwriting of the user acquired at the current time as an authenticated 3D signature handwriting of the user;
or,
the electronic device further comprises a biological feature authentication module and a signature storage module, wherein,
the biological feature authentication module is configured to: receive biological feature information of the user acquired by a sensor in real time through the electronic tag in the signature process, perform authentication on the received biological feature information based on pre-stored authenticated biological feature information of the user after signing, and when the authentication passes, send a notification to the signature storage module; and
the signature storage module is configured to: after the notification is received, save the 3D signature handwriting of the user acquired at the current time as an authenticated 3D signature handwriting of the user,
or,
the electronic device further comprises a signature authentication module, wherein, the signature authentication module is configured to: perform comparative identification on the 3D signature handwriting of the user acquired at the current time based on pre-stored authenticated 3D signature handwriting of the user after signing, wherein when the identification passes, signature authentication at the current time passes;
or,
the electronic device further comprises a system for performing identity authentication based on a biological electronic tag and a signature authentication module, wherein,
the system for performing identity authentication based on the biological electronic tag is configured to perform identity authentication on the user in the signature process, and when the identity authentication passes, send a notification to the signature authentication module; and
the signature authentication module is configured to: after the notification is received, perform comparative identification on the 3D signature handwriting of the user acquired at the current time based on the pre-stored authenticated 3D signature handwriting of the user, wherein when the identification passes, signature authentication at the current time passes;
or,
the electronic device further comprises a biological feature authentication module and a signature authentication module, wherein,
the biological feature authentication module is configured to: receive biological feature information of the user acquired by a sensor in real time through the electronic tag in the signature process, perform authentication on the received biological feature information based on the pre-stored authenticated biological feature information of the user after signing, and when the authentication passes, send a notification to the signature authentication module; and
the signature authentication module is configured to: after the notification is received, perform comparative identification on the 3D signature handwriting of the user acquired at the current time based on the pre-stored authenticated 3D signature handwriting of the user, wherein when the identification passes, signature authentication at the current time passes.

14. The electronic device according to claim 13, wherein:
the system for performing identity authentication based on the biological electronic tag comprises an electronic tag reader module and an authentication judgment module, wherein:
the electronic tag reader module is configured to: after the electronic tag reader module is turned on, periodically transmit a radio frequency signal and detect a response of the biological electronic tag in the signature process, wherein each period comprises a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and
the authentication judgment module is configured to: judge whether the spatial position information of the biological electronic tag is capable of being detected on each time slice in the signature process, wherein when the spatial position information of the biological electronic tag is capable of being detected on each time slice in the signature process, the identity authentication passes.

15. The electronic device according to claim 12, wherein: the system for performing spatial positioning on the electronic tag is further configured to: record information about time that the electronic tag moves to each positioning point while performing spatial positioning in the signature process, to determine a moving position, speed and direction of the electronic tag in the radio frequency electromagnetic field.

16. An electronic device, used for 3D human-computer interaction, comprising an operation identification module and the system for performing spatial positioning on an electronic tag according to claim 10, wherein:
the system for performing spatial positioning on an electronic tag is configured to: perform continuous spatial positioning on an electronic tag which moves with a user limb in the radio frequency electromagnetic field in a 3D human-computer interaction process; and
the operation identification module is configured to: determine a moving trace of the user limb in the radio frequency electromagnetic field according to spatial position information obtained through spatial positioning, convert the moving trace into a moving trace in a 3D holographic image space and accordingly identify an operation of the user.

17. The electronic device according to claim 16, wherein:
the operation identification module is configured to determine the moving trace of the user limb in the radio frequency electromagnetic field according to spatial position information obtained through spatial positioning according to the following mode:
using a rectangular coordinate system formed by three sets of array antennas arranged on the electronic device as a three-dimensional space coordinate system of the 3D holographic image space, and using the moving trace of the electronic tag in the rectangular coordinate system as the moving trace in the 3D holographic image space.

18. The electronic device according to claim 16, wherein:
the electronic device further comprises a system for performing identity authentication based on a biological electronic tag, wherein,
the system for performing identity authentication based on the biological electronic tag is configured to: perform identity authentication on the user in the 3D human-computer interaction process, and when the identity authentication passes, accept the operation of the user, and when the identity authentication does not pass, not accept the operation of the user; and
the system for performing identity authentication based on the biological electronic tag comprises an electronic tag reader module and an authentication judgment module, wherein:
the electronic tag reader module is configured to: after the electronic tag reader module is turned on, periodically transmit a radio frequency signal and detect a response of the biological electronic tag in the 3D human-computer interaction process, wherein each period comprises a plurality of time slices, frequency and transmitting power of the radio frequency signal are set on each time slice by using a pair of frequency-power values in an expected user-specific frequency-minimum response power sequence, and all frequency-power values in the frequency-minimum response power sequence are used in one period; and
the authentication judgment module is configured to: judge whether the spatial position information of the biological electronic tag is capable of being detected on each time slice in the 3D human-computer interaction process, wherein when the spatial position information of the biological electronic tag is capable of being detected on each time slice in the 3D human-computer interaction process, the identity authentication passes, and when the spatial position information of the biological electronic tag is not capable of being detected on each time slice in the 3D human-computer interaction process, the identity authentication does not pass.

* * * * *